2,970,944
PARENTERAL SOLUTIONS OF STEROID PHOSPHATES STABILIZED WITH CREATININES

Walter F. Charnicki, North Wales, and Robert E. King, Chalfont, Pa., assignors to Merck & Co., Inc., Rahway, N.J., a corporation of New Jersey No Drawing. Filed Apr. 4, 1958, Ser. No. 726,353

2 Claims. (Cl. 167—77)

This invention relates to pharmaceutical formulations suitable for parenteral administration. In one of its more particular aspects this invention relates to soluble steroid solutions.

Steroids have found extensive use in medications for preventing or suppressing inflammatory reactions of various kinds. Steroids of the pregnane series in particular, such as cortisone, hydrocortisone, prednisone and prednisolone, have proved especially efficient in alleviating suffering due to arthritis and related diseases. However, the administration of such steroids has been hampered because of the solubility characteristics of these compounds and especially because water soluble steroids have not been available heretofore. This is particularly the case where it is desired to administer the steroid parenterally, such as subcutaneously, intramuscularly, intravenously or intra-articularly. With the advent of steroid phosphates, particularly of the pregnane series, for example, hydrocortisone phosphate and prednisolone phosphate, it has become feasible to formulate aqueous solutions of these steroids, since salts of these steroid phosphates are quite water soluble.

It is an object of this invention to provide parenteral solutions containing steroids of the pregnane series.

Another object of this invention is to provide aqueous solutions of steroids which are stable against various degradation and decomposition reactions.

A further object of this invention is to provide such solutions containing sufficiently high concentrations of steroids to enable their use as formulations for injection.

It is yet a further object of this invention to provide steroid formulations which are highly stable upon standing for long periods of time.

Other objects and advantages of the instant invention will become apparent in the course of the following detailed description and disclosure.

The above listed and other objects are accomplished by using a mixture of a steroid phosphate and a suitable stabilizer. The steroid phosphates of these formulations are the phosphates of steroids of the pregnane series, particularly those of the $\Delta^4$- and the $\Delta^{1,4}$-steroids such as cortisone, hydrocortisone, prednisone and prednisolone. Various halogenated and otherwise substituted derivatives of these compounds can be used as well. For instance, the 9α-halo compounds such as 9α-fluorohydrocortisone, and the 16-methyl steroids, such as 16-methylprednisolone, are satisfactory for this purpose.

The steroid phosphates are advantageously used in the form of their salts. Of the salts which are particularly useful, the sodium salts and the triethylamine salts are of special interest, but other water soluble alkali metal or organic base salts may likewise be used.

Although aqueous solutions of steroid phosphate salts are colorless and free from insoluble matter when freshly made, these solutions, upon standing at room temperature or at elevated temperatures, begin to deteriorate. The deterioration is evidenced by the formation of a precipitate and by the development of a yellow color. This condition may be due to hydrolysis of the ester, whereby the free alcohol is precipitated or to other factors such as oxidative degradation. Since it is essential that a solution being used for injection be absolutely free from insoluble matter, it is necessary to prevent completely the formation of precipitates in these solutions.

The extent to which precipitates develop depends upon various factors such as the concentration of the steroid phosphate in solution, the pH of the solution, the temperature of storage and the length of time the solution is permitted to stand.

It has now been found that the stability of aqueous steroid phosphates can be increased by incorporation in such solutions of a small amount of a nitrogen containing compound such as niacinamide, creatinine or derivatives thereof, for example, N-methylcreatinine. These compounds act as stabilizers for the steroid phosphates and prevent the formation of precipitates for long periods of time. Stabilization of the steroid phosphate is effectively accomplished by using a concentration of stabilizer of from about one-fifth the concentration of the steroid phosphate in solution to approximately two and one-half times the concentration of the steroid phosphate on a weight basis.

In addition to these stabilizers and since a certain proportion of any decomposition evidenced is due to oxidative degradation, it is desirable to include in these formulations a small amount of antioxidant. Suitable antioxidants include both inorganic compounds and organic compounds. For example, inorganic antioxidants such as sodium sulfite, sodium bisulfite and sodium hypophosphite are suitable. Organic antioxidants such as sodium citrate, penicillamine, pyridinesulfinic acid, thiourea and sodium formaldehyde sulfoxylate, for example, are also acceptable. A preferred antioxidant is sodium bisulfite. The antioxidant may be included in these compositions in a concentration of from about one-tenth the concentration of the steroid phosphate to about one-half the concentration of the steroid phosphate on a weight basis.

In addition to the stabilizer and the antioxidant, other substances may be included in these formulations. A bacteriological preservative, for example, may be used if desired, but if the formulation is to be subdivided into single dose containers under absolutely sterile conditions, then the preservative may be omitted. For this purpose phenol or benzyl alcohol has been found particularly satisfactory. Other preservatives which are pharmaceutically acceptable may also be used. The preservatives are generally employed in a concentration of from about one-fourth to about the same concentration as the steroid phosphate on a weight basis.

The parenteral solutions of this invention are desirably maintained at a hydrogen ion concentration identical to that of human blood, usually pH 7.4, although a pH in the range of from pH 7.0 to about pH 7.8 is acceptable. Since the solution is, as formulated, of a hydrogen ion concentration giving a pH in the range of from about pH 5.0 to pH 8.5, it is necessary to adjust the hydrogen ion concentration of these solutions either by treatment with a dilute acid, where it is desired to lower the pH, or a dilute base, where the pH is to be raised. Suitable acids for this purpose include phosphoric acid and hydrochloric acid and suitable bases include sodium hydroxide and potassium hydroxide. In general, only enough acid or base is added to adjust the pH to the desired level.

The following examples are included for the purpose of illustration and are not to be construed as any undue limitation of the scope of the appended claims.

Example 1

A formulation having the following composition was prepared:

| | Mg. per ml. |
|---|---|
| Prednisolone phosphate (as monosodium salt)-steroid phosphate | 10 |
| Niacinamide-stabilizer | 25 |
| Sodium bisulfite-antioxidant | 2 |
| Phenol-preservative | 5 |
| Sodium hydroxide q.s. pH 7.5 | |
| Water for injection q.s. | |

The antioxidant was dissolved in water previously boiled and nitrogen-sparged. The steroid phosphate was then dissolved and the resulting solution was clarified by filtration. The preservative was then dissolved in an equal volume of water previously nitrogen-sparged. The two solutions were mixed and the pH adjusted to pH 7.5 by the addition of only so much dilute sodium hydroxide as was necessary. The stabilizer was then added and stirred into solution. The resulting solution was sterilized by aseptic filtration under nitrogen pressure and then subdivided.

Example 2

A formulation having the following composition was prepared according to the procedure of Example 1:

| | Mg. per ml. |
|---|---|
| Hydrocortisone phosphate (as monosodium salt) | 20 |
| Creatinine | 10 |
| Sodium bisulfite | 2 |
| Phenol | 5 |
| Sodium hydroxide q.s. pH 7.5 | |
| Water for injection q.s. | |

Example 3

The following formulation was prepared according to the procedure of Example 1:

| | Mg. per ml. |
|---|---|
| Cortisone phosphate (as monosodium salt) | 10 |
| Niacinamide | 25 |
| Sodium bisulfite | 2 |
| Benzyl alcohol | 9 |
| Sodium hydroxide q.s. pH 7.5 | |
| Water for injection q.s. | |

Example 4

A formulation having the following composition was prepared according to the procedure of Example 1:

| | Mg. per ml. |
|---|---|
| Hydrocortisone phosphate (as monosodium salt) | 10 |
| Niacinamide | 25 |
| Sodium bisulfite | 2 |
| Phenol | 5 |
| Sodium hydroxide q.s. pH 7.5 | |
| Water for injection q.s. | |

Example 5

A formulation having the following composition was prepared:

| | Mg. per ml. |
|---|---|
| Prednisolone phosphate (as monosodium salt) | 10 |
| Niacinamide | 25 |
| Sodium hydroxide q.s. pH 7.5 | |
| Water for injection q.s. | |

The steriod and stabilizer were dissolved in previously boiled and nitrogen-sparged water. Sodium hydroxide was added in dilute solution to adjust the hydrogen ion concentration of the solution to pH 7.5. The solution was sterilized by aseptic filtration under nitrogen pressure and was filled into 1 cc. ampuls and flame-sealed under nitrogen.

Various changes and modifications of the invention can be made, and to the extent that such variations incorporate the spirit of the instant invention, they are intended to be included within the scope of the appended claims.

What is claimed is:

1. A pharmaceutical formulation suitable for parenteral administration comprising, in an aqueous solution having a pH of 7.0 to 7.8, (a) a water soluble steroid phosphate selected from the group consisting of phosphates of 11-oxygenated-$\Delta^4$-pregnene-17$\alpha$,21-diol-3,20-diones, phosphates of 11-oxygenated-$\Delta^{1,4}$-pregnadiene-17$\alpha$,21-diol-3,20-diones, and alkali metal salts thereof, and (b) a stabilizer tending to prevent deterioration of the steroid phosphate, and consequent yellowing of the solution and formation of a precipitate, said stabilizer being selected from the group consisting of creatinine and N-methylcreatinine.

2. The composition of claim 1 wherein the water soluble steroid phosphate is present as the sodium salt, wherein the concentration of the stabilizer is less than that of the steroid phosphate on a weight basis, and wherein the composition includes an anti-oxidant selected from the group consisting of sodium bisulfite, sodium sulfite, sodium hypophosphite and sodium citrate, in a concentration from about one-tenth to one-half the concentration of the steroid phosphate on a weight basis.

References Cited in the file of this patent

UNITED STATES PATENTS

| 2,005,667 | Steinbrink | June 18, 1935 |
| 2,088,590 | Engels et al. | Aug. 3, 1937 |
| 2,650,894 | Fine | Sept. 1, 1953 |
| 2,779,775 | Sarett | Jan. 29, 1957 |
| 2,789,117 | Sarett | Apr. 16, 1957 |
| 2,808,361 | Bavouset | Oct. 1, 1957 |

OTHER REFERENCES

Quart. Jour. of Pharmacy and Pharmacology, 21, 1948, pp. 451–469 (only p. 451 relied on).